United States Patent [19]
Yasuda

[11] Patent Number: 5,657,310
[45] Date of Patent: Aug. 12, 1997

[54] OPTICAL DISC

[75] Inventor: Koichi Yasuda, Kanagawa, Japan

[73] Assignee: Sony Corporation, Tokyo, Japan

[21] Appl. No.: 564,640

[22] Filed: Nov. 29, 1995

[30] Foreign Application Priority Data

Nov. 29, 1994 [JP] Japan ................................. 6-294916

[51] Int. Cl.⁶ ................................................. G11B 7/24
[52] U.S. Cl. ............................................... 369/275.1
[58] Field of Search ........................... 369/275.1–275.4, 369/13

[56] References Cited

U.S. PATENT DOCUMENTS 5,341,358  8/1994  Kobayashi et al. ................. 369/275.2

*Primary Examiner*—Nabil Hindi
*Attorney, Agent, or Firm*—Hill, Steadman & Simpson

[57] ABSTRACT

An optical disc comprising transparent substrate, a phase-changing material layer disposed on the transparent substrate and made of a material which is phase-changeable by radiation of a light beam, a reflecting film layer disposed on the phase-changing material layer, and a cooling layer disposed between the phase-changing material layer and the reflecting layer, wherein the cooling layer has a heat conductivity ranging from 0.25 J/cmKs to 20.00 J/cmKs. The optical disc of the present invention has such a structure that a crystal phase portion of the phase-changing material layer shows a higher light absorptivity than that of the amorphous phase portion and exhibits a high carrier to noise ratio (C/N ratio) irrespective of a line speed upon rotational driving of the optical disc.

6 Claims, 1 Drawing Sheet

OPTICAL DISC

BACKGROUND OF THE INVENTION

This invention relates to an optical disc on which information is recorded, or from which the information recorded is reproduced, by radiation of a light beam from a laser, and more particularly to an optical disc suitable for recording information at a high density.

An optical disc of a so-called phase-changing type is known in the art. The optical disc of this type includes a transparent substrate on which at least a phase-changing material layer, a protective layer and a reflecting layer are formed. Further, the reflecting layer is covered with an protective over-coating layer, if necessary.

In the optical disc of such a type, the phase-changing material layer is initially maintained in a crystalline state. When a write beam from a laser is radiated on a predetermined spot-like portion of a surface of the optical disc, the portion of the phase-changing material layer is allowed to change from a crystal phase to a liquid phase. Thereafter, the liquid phase portion of the phase-changing material layer is rapidly cooled to form an amorphous phase portion in the form of pit. As a result, the amorphous phase portion of the phase-changing material layer formed by radiation of the write beam from the laser is caused to have a different reflection coefficient from the inherent crystal phase portion thereof. A read-out (reproduction) of the information recorded is performed by detecting a signal indicative of change (reduction) in the reflection coefficient of the amorphous phase portion.

Meanwhile, in the case of the optical disc of such a phase-changing type, the recording has been generally carried out by using a pit position-recording method.

In addition to this recording method, there has been also known a so-called pit length-recording method capable of recording an information at a high density. However, the pit length-recording method has such a problem that the recording accuracy and therefore the exact reproduction of data recorded is likely to be adversely affected due to possible fluctuation of the position of the amorphous pit formed on the surface of the optical disc. Consequently, in the case where the recording of information signal on the optical disc is carried out by using the pit length-recording method, it is desired that the layer structure on the substrate is so formed that the fluctuation of the pit position is unlikely to occur.

In the known optical disc, in order to prevent occurrence of the fluctuation of the pit position, the inherent crystal phase portion of the phase-changing material layer has a higher light absorptivity, i.e., a higher thermal absorptivity than that of the amorphous phase portion thereof which is formed by radiation of the light beam. However, in the optical disc having such a construction, the phase-changing material layer can be cooled only at a slow rate due to the high absorptivity of the crystal phase portion, so that there occurs a problem that the writing of the information signal must be performed at a line speed of 10 m/second or greater to avoid too much retention of heat in the crystal phase portion. The present invention has been made to overcome the above-mentioned problems encountered in the prior art.

SUMMARY OF THE INVENTION

Accordingly, it is an object of the present invention to provide an optical disc having such a layer structure capable of being rapidly cooled nevertheless the crystal phase portion of the phase-changing material layer shows a higher light absorptivity, i.e., a higher thermal absorptivity than that of the amorphous phase portion thereof. The optical disc of the present invention exhibits a suitable carrier to noise ratio (hereinafter referred to as a "C/N ratio") even though the writing of the information signal on the optical disc can be performed at a line speed of 10 m/second or lower.

It has been found by the present inventors that, when a protective and cooling layer or a cooling layer having a heat conductivity in a predetermined range is provided between a phase-changing material layer and a reflecting film layer and when the protective and cooling layer or the cooling layer is formed of a material exhibiting a transparency in a range of the wave-length of a visible light, namely having no interference with the visible light, the layer structure of the optical disc can be rapidly cooled nevertheless the crystal phase portion of the phase-changing layer shows a higher light absorptivity, i.e., a higher thermal absorptivity than that of the amorphous phase portion thereof.

In accordance with the present invention, there is provided an optical disc comprising a transparent substrate, a phase-changing material layer disposed on the transparent substrate and made of a material which is phase-changeable by radiation of a light beam, a reflecting film layer disposed on the phase-changing material layer, and a cooling layer disposed between the phase-changing material layer and the reflecting film layer, wherein the cooling layer has a heat conductivity ranging from 0.25 J/cmKs to 20.00 J/cmKs.

The optical disc according to the present invention is of a phase-changing type in which a portion of the phase-changing material layer is changeable from a crystal phase to a liquid phase when a write beam from a laser is radiated on a surface of the optical disc and then the liquid phase portion formed by the radiation of the write beam is rapidly cooled to form an amorphous phase portion in the form of pit. By adopting the above-mentioned layer construction, the rapid cooling of the liquid phase portion of the phase-changing material layer can be achieved nevertheless the crystal phase portion shows a higher light absorptivity, i.e., a higher thermal absorptivity than that of the amorphous phase portion.

In the optical disc according to the present invention, a protective layer may be formed separately from the cooling layer. In this case, the protective layer and the cooling layer is in turn disposed between the phase-changing material layer and the reflecting film layer.

Alternatively, a single layer having a combined function of the protective and cooling layers may be formed between the phase-changing material layer and the reflecting layer.

The combined protective and cooling layer or the single cooling layer thus formed between the phase-changing material layer and the reflecting layer on the transparent substrate, has a heat conductivity of the limited range and is formed of a material exhibiting a transparency in a range of the wave length of a visible light, namely having no interference with the visible light so that the phase-changing material layer can have a rapidly-cooled structure. Even though the crystal phase portion of the phase-changing material layer shows a higher light absorptivity, i.e., a higher thermal absorptivity than the amorphous phase portion thereof, the output having a high C/N ratio can be obtained irrespective of the line speed upon the writing.

DETAILED DESCRIPTION OF THE INVENTION

Figure 1:
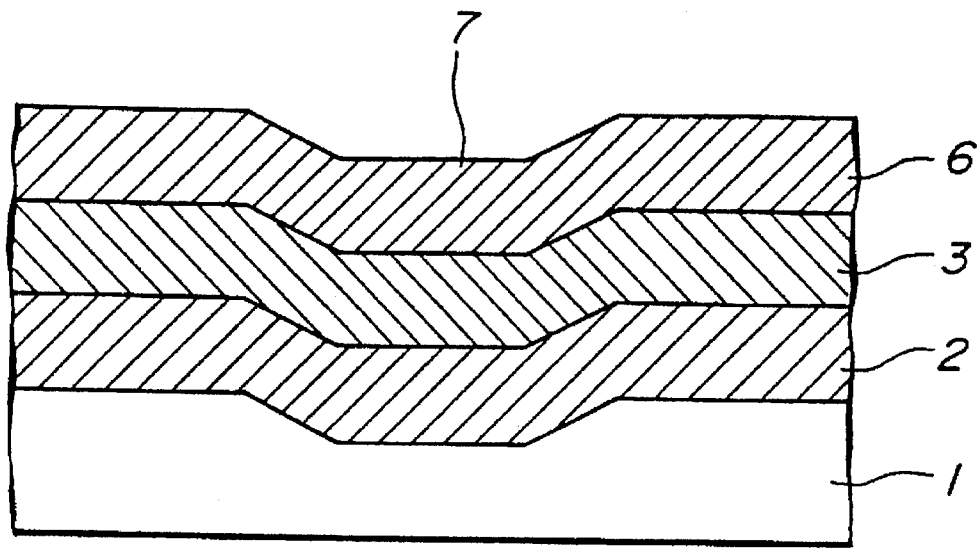
FIG. 1 is a sectional view of an optical disc according to one embodiment of the present invention.

Referring to FIG. 1, there is shown an optical disc according to a first embodiment of the present invention. The optical disc comprises a transparent substrate 1 on which a groove 7 is formed. Formed on the transparent substrate are in turn a phase-changing material layer 2, a protective and cooling layer 3 having combined protective and cooling functions and a reflecting film layer 6.

The transparent substrate 1 may be formed, for example, of a material such as an acrylic resin, a polyolefin resin, glass or the like.

First, the phase-changing material layer 2 is formed on the transparent substrate 1. The phase-changing material layer 2 initially shows a crystal phase structure before radiation of a write beam. When the phase-changing material layer is exposed to the write beam, for example a light beam emitted from a laser, the portion radiated by the write beam undergoes a phase change from a crystal phase to a liquid phase. Thereafter, the liquid phase portion is rapidly cooled so as to undergo a further phase change from a liquid phase to an amorphous phase so that the portion radiated by the write beam has a different reflection coefficient from those portions which are not radiated by the write beam and therefore remains in a state of a crystal phase.

Examples of such a phase-changing material layer 2 may include As—Te—Ge series film layer, Te—Ge—Sn series film layer, Te—Ge—Sn—O series film layer, Te—Se series film layer, Sn—Te—Se series film layer, Te—Ge—Sn—Au series film layer, Ge—Sb—Te series film layer, Sb—Te—Se series film layer, In—Se—Tl series film layer, In—Sb series film layer, In—Sb—Se series film layer, Ag—Zn alloy film layer, Cu—Al—Ni alloy film layer, In—Se—Tl—Co series film layer, Si—Te—Sn series film layer, a thin film layer of a low-oxide such as $TeO_x$ wherein X represents a number greater than 0 but less than 2, or the like.

A method of forming the phase-changing material layer is not particularly restricted but any known method such as a depositing method and a spattering method can be employed.

Formed on the phase-changing material layer 2 is the protective and cooling layer 3 having a combined protective and cooling functions. The protective and cooling layer 3 may be formed of a material having a heat conductivity ranging from 0.25 J/cmKs to 20.00 J/cmKs and exhibiting a transparency in a range of a visible light, namely having no interference with the visible light. Examples of the material usable for the protective and cooling layer 3 may include a nitride, an oxide, a sulfide, a carbide or other compounds of metal or a semiconductor element selected from Al, Zn, Zr, Si, or the like.

Generally, as is known, the material which has no interference with a visible light having a wave length λ of 4000 Å or greater (4000 Å is a wave-length of a light located in a boundary region between a visible light and an ultraviolet light), includes those having an energy gap Eg of 3 eV or more. Specific examples of suitable material used for the protective and cooling layer 3 may include $Al_2O_3$, AlN, $Al_2S_3$, ZnS, $ZnO_2$, $SiO_2$, $Si_3N_4$, SiC, $SiS_2$, or the like.

Further, a reflecting film layer 6 is formed on the protective and cooling layer 3. Examples of a suitable material used for the reflecting film layer 8 may include, for example, Dy, Al, Au or the like.

Figure 2:
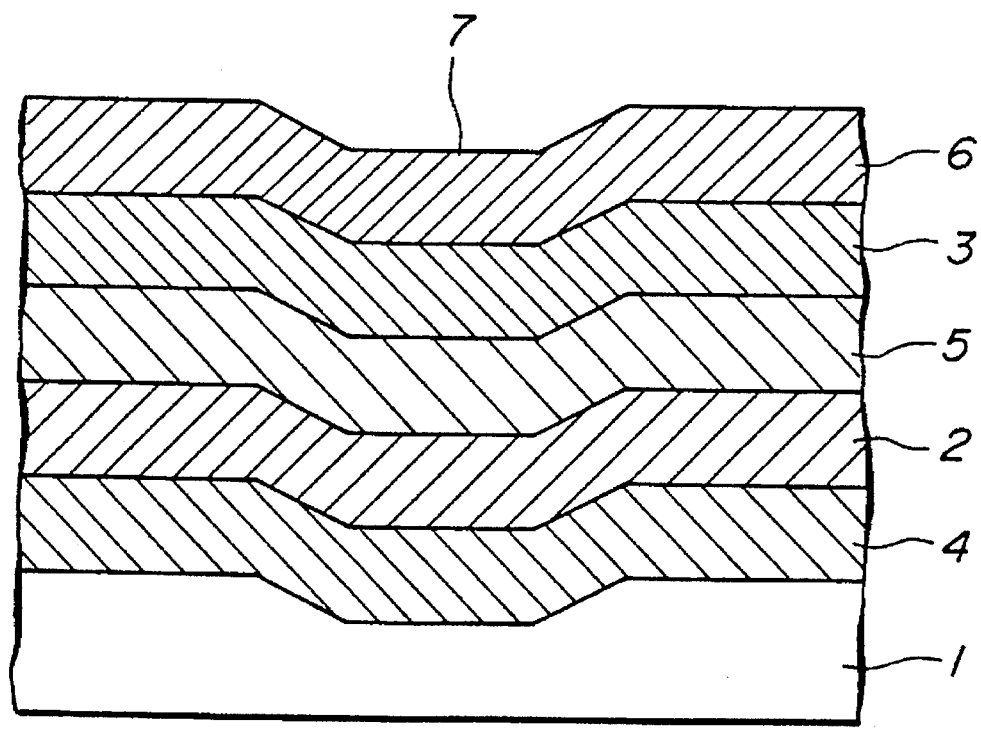
FIG. 2 is a sectional view of an optical disc according to another embodiment of the present invention.

Referring to FIG. 2, an optical disc according to a second embodiment of the present invention is shown in section. In contrast with the optical disc of the above first embodiment as shown in FIG. 1 in which the single layer 3 having a combined protective and cooling functions is provided between the phase-changing material layer 2 and the reflecting film layer 6, the optical disc of the second embodiment as shown in FIG. 2 has two separate protective layers in addition to the protective and cooling layer 3. The first protective layer 4 is disposed between the transparent substrate 1 and the phase-changing material layer 2 while the second protective layer 5 is disposed between the phase-changing material layer 2 and the protective and cooling layer 3.

The first and second protective layers 4 and 5 may be formed of, for example, a nitride, an oxide, a sulfide or other compounds of metal or a semiconductor element such as Al, Si and the like, which do not show an absorptivity in a range of the wave-length of a light beam emitted from a semiconductor laser.

Moreover, a further protective layer (not shown) may be formed on the reflecting film layer 6, if desired.

EXAMPLES

The present invention is now described in more detail by way of examples but these examples are not intended to constitute a limitation of the present invention.

Example 1

First, a glass 2P substrate was used so as to obtain an transparent substrate 1 for an optical disc on which a groove 7 having a track pitch P of 1.0 μm, a depth d of about 80 nm and a width W of 0.35 μm was formed. Incidentally, the symbol "2P" means that the glass substrate is manufactured by a photopolymerization method.

A composition composed of 80 parts of ZnS and 9.0 parts of $SiO_2$ was deposited onto a primary surface of the transparent substrate 1 to form a first protective layer 4 having a thickness of 100 nm. Further, a ternary alloy having a formula of $Ge_{0.22}Sb_{0.22}Te_{0.56}$ (wherein the number appearing on the lower right side of each element indicates a ratio thereof) was deposited on the first protective layer 4 to form a phase-changing material layer 2 having a thickness of 20 nm.

Successively, a composition composed of 80 parts of ZnS and 20 parts of $SiO_2$ was deposited onto the phase-changing material layer 2 to form a second protective layer 5 having a thickness of 5 nm.

Furthermore, aluminum nitride (AlN) was deposited on the second protective layer 5 to form a protective and cooling layer 3 having a film thickness of 45 nm. Then, a gold (Au) was deposited on the protective and cooling layer 3 to form a reflecting film layer 8 having a thickness of 10 nm whereby an optical disc of the present invention was obtained.

The thus obtained optical disc was radiated by a write beam emitted from a laser to write an information signal thereon. In this case, the writing was performed under such conditions in which a line speed for rotational driving of the optical disc was set to 5 m/second, and other parameters were set to the following values; a wave length of a light beam emitted from a laser diode to 680 nm, a numerical aperture of an objective lens to 0.55, a frequency for driving the laser diode or data-writing to 3.75 MHz, a pulse width to 107 ns, a write laser power to 15 mW and a read laser power to 1 mW. After the written information signal was erased at an erasing laser power of 7 mW, the optical disc was radiated by a light beam from the laser in which the same conditions as described above was employed except that the frequency was changed to 1.4 MHz, to write another information signal on the optical disc.

As a result, it was recognized that an erasing ratio of the previously recorded information signal was 35 dB, which shows that the optical disc had a good erasing performance.

Example 2

An optical disc was produced in the same manner as described in Example 1 above except that the second protective layer 5 composed of 80 parts of ZnS and 20 parts of $SiO_2$ was omitted and the protective and cooling layer 3 having a film thickness of 50 nm was directly laminated over the phase-changing material layer 2 composed of AlN.

The thus obtained optical disc was subjected to writing and erasing of the information signals under the same conditions and in the same manner as described in Example 1. The optical disc was further radiated by a light beam at a frequency of 1.4 MHz to write another information signal thereon.

As a result, it was confirmed that an erasing ratio of the previously recorded information signal was 30 dB which also shows that the optical disc had a good erasing performance.

Comparative Example 1

Example 1 was repeated in the same manner as described above except that the thickness of the second protective layer 5 composed of 80 parts of ZnS and 20 parts of $SiO_2$ was changed to 50 nm and the protective and cooling layer 3 composed of AlN was omitted.

The thus obtained optical disc was subjected to writing and erasing of the information signals under the same conditions and in the same manner as described in Example 1. The optical disc was further radiated by a light beam at a frequency of 1.4 MHz to write another information signal thereon.

As a result, it was confirmed that an erasing ratio of the previously recorded information signal was 10 dB. This shows that the optical disc had a poor and insufficient erasing performance because a good erasing ratio for digitally recorded signals is generally 20 dB or more.

As is apparent from the above description, in accordance with the present invention, a protective and cooling layer or a cooling layer, which has a heat conductivity falling within the above-mentioned predetermined range and exhibits a transparency in a range of the wave length of a visible light, namely has no interference with the visible light, is formed between the phase-changing material layer and the reflecting layer, so that the phase-changing material layer of the optical disc has a structure capable of being rapidly cooled down. The layer structure effectively prevents occurrence of fluctuation of the pit positions on the optical disc nevertheless the crystal phase portion of the phase-changing material layer shows a higher light absorptivity, i.e., a higher thermal absorptivity than the amorphous phase portion thereof.

What is claimed is:

1. An optical disc comprising:

a transparent substrate;

a phase-changing material layer disposed of said transparent substrate and made of a material which is phase-changeable by radiation of a light beam, said phase-changing material selected from the group consisting of As—Te—Ge series films, Te—Ge—Sn series films, Te—Ge—Sn—O series films, Te—Se series films, Sn—Te—Se series films, Te—Ge—Sn—Au series films, Ge—Sb—Te series films, Sb—Te—Se series films, In—Se—Tl series films, In—Sb series films, In—Sb—Se series films, Ag—Zn alloy films, Cu—Al—Ni alloy films, In—Se—Tl—Co series films, Si—Te—Sn series films, a thin film layer of $TeO_x$ wherein x represents a number greater than 0 but less than 2, a portion of said phase-changing material layer being changeable to a liquid phase when the portion is radiated by the light beam and then the liquid phase portion is rapidly cooled to form an amorphous phase portion which has a different reflection coefficient from that of an inherent crystal phase of said phase-changing material layer;

a reflecting fill layer disposed on said phase-changing material layer; and a cooling layer disposed between said phase-changing material layer and said reflecting layer, wherein said cooling layer being formed of a nitride, an oxide, a sulfide or a carbide of an element selected from the group consisting of Al, Zn, Zr or Si, and wherein said cooling layer has a heat conductivity ranging from 0.25 J/cmKs to 20.00 J/cmKs and an energy gap of 3 eV or greater.

2. The optical disc according to claim 1, wherein a portion of said phase-changing material layer being changeable to a liquid phase when the portion is radiated by a write beam and then the liquid phase portion is rapidly cooled to form an amorphous phase portion which has a different reflection coefficient from that of an inherent crystal phase of said phase-changing material layer.

3. The optical disc according to claim 1, wherein said cooling layer has a function as a protective layer.

4. The optical disc according to claim 1, further comprising a protective layer which is interposed between said phase-changing material layer and said cooling layer.

5. The optical disc according to claim 1, wherein said cooling layer has an energy gap of 3 eV or greater.

6. The optical disc according to claim 1, wherein said cooling layer is formed of $Al_2O_3$, AlN, $Al_2S_3$, ZnS, $ZnO_2$, $SiO_2$, $Si_3N_4$, SiC or $SiS_2$.

* * * * *